United States Patent [19]

Kroenert et al.

[11] Patent Number: 4,831,602
[45] Date of Patent: May 16, 1989

[54] SIMULTANEOUS COHERENT AND INCOHERENT PROCESSOR FOR SONAR SIGNALS

[75] Inventors: John T. Kroenert, Barrington; Robert B. Delisle, Tiverton, both of R.I.

[73] Assignee: Raytheon Company, Lexington, Mass.

[21] Appl. No.: 33,305

[22] Filed: Apr. 2, 1987

[51] Int. Cl.⁴ .............................................. G01S 15/34
[52] U.S. Cl. .............................. 367/100; 364/724.03; 367/99
[58] Field of Search ................. 367/88, 100, 101, 103, 367/105; 364/516, 728, 728.03

[56] References Cited

U.S. PATENT DOCUMENTS

| | | | |
|---|---|---|---|
| Re. 31,509 | 1/1984 | Neidell | 367/100 |
| 3,579,180 | 5/1971 | Taddeo | 367/122 |
| 3,622,963 | 11/1971 | Sage | 367/97 |
| 3,681,747 | 8/1972 | Walsh | 367/100 |
| 3,750,152 | 7/1973 | Waful | 367/100 |
| 4,330,876 | 5/1982 | Johnson | 367/105 |
| 4,404,665 | 9/1983 | Kits van Heynigen | 367/100 |

*Primary Examiner*—Thomas H. Tarcza
*Assistant Examiner*—T. R. Swann
*Attorney, Agent, or Firm*—Martin M. Santa; Richard M. Sharkansky

[57] ABSTRACT

A receiver for active sonar systems comprises two fundamentally different detection processes operating simultaneously with the output of each detection process being combined by a computer utilizing a computer-aided detection algorithm. One detection processor is a segmented replica correlator (SRC) and the other detection processor is a polarity coincidence correlator (PCC). Each detection processor provides to the active computer-aided detection algorithm a list of ranges and bearings of a relatively small number of detection events. The computer algorithm operates on these events to compare events from the current ping and the previous ping for each of the processors.

13 Claims, 7 Drawing Sheets

POLARITY COINCIDENCE CORRELATOR

SEGMENTED REPLICA CORRELATOR

SIMULTANEOUS COHERENT AND INCOHERENT PROCESSOR FOR SONAR SIGNALS

BACKGROUND OF THE INVENTION

This invention relates to sonar receivers and more particularly to receivers which are operated in parallel to provide outputs at a low false alarm rate which are processed by a computer using an algorithm which selects for presentation on a display only those signals which have a high probability of originating by a reflection of the transmitted signal from a reflecting object and not from noise or reverberation.

In the prior art, sonar signals from targets have been detected by using a receiver in conjunction with an operator wherein signals observed on a display are determined to be reflected signals from objects as distinguished from signal produced by reverberation or noise produced by the ocean or by the ship on which the sonar is being carried.

In order to reduce the dependence upon visual observation of the display by an operator for the detection of reflecting objects, it is desired to provide an active receiver which will provide a presentation of reflecting objects with high probability of detection while at the same time providing a presentation on the display from other than a reflecting object with low probability.

Current sonar practice is to display raw data (i.e. a substantial amount of clutter or random events from other than a reflecting object) and require the operator to decide if a reflecting object is present. It is an object of this invention to provide a system employing an algorithm which provides a totally new approach to the detection process in that only geographically consistent or target events from reflecting objects are displayed. Random or clutter events are not displayed, so true clutter-free operation is achieved.

SUMMARY OF THE INVENTION

A receiver for active sonar systems comprises two fundamentally different detection processes operating simultaneously with the output of each detection process being combined by a computer utilizing a computer-aided detection algorithm. One detection processor is a segmented replica correlator (SRC) and the other detection processor is a polarity coincidence correlator (PCC). The SCR disclosed herein is a modified replica correlator operating on a full sum beam output. The PCC is a split beam cross-correlator. These two receivers have complementary characteristics which are utilized to improve the detection performance of the system. The outputs of the receivers after filtering and interpolation are individually thresholded to provide a prescribed false alarm rate. Each detection processor provides to the active computer-aided detection algorithm a list of ranges and bearings of a relatively small number of potential detection events. The computer algorithm operates on these events to compare events from the current ping and the previous pings from each of the processors to provide output detection events from reflecting objects free of clutter events.

BRIEF DESCRIPTION OF THE DRAWINGS

The aforementioned aspects and other features of this invention will be apparent from the following description taken in conjunction with the accompanying drawings wherein.

DESCRIPTION OF THE PREFERRED EMBODIMENT

Figure 1:
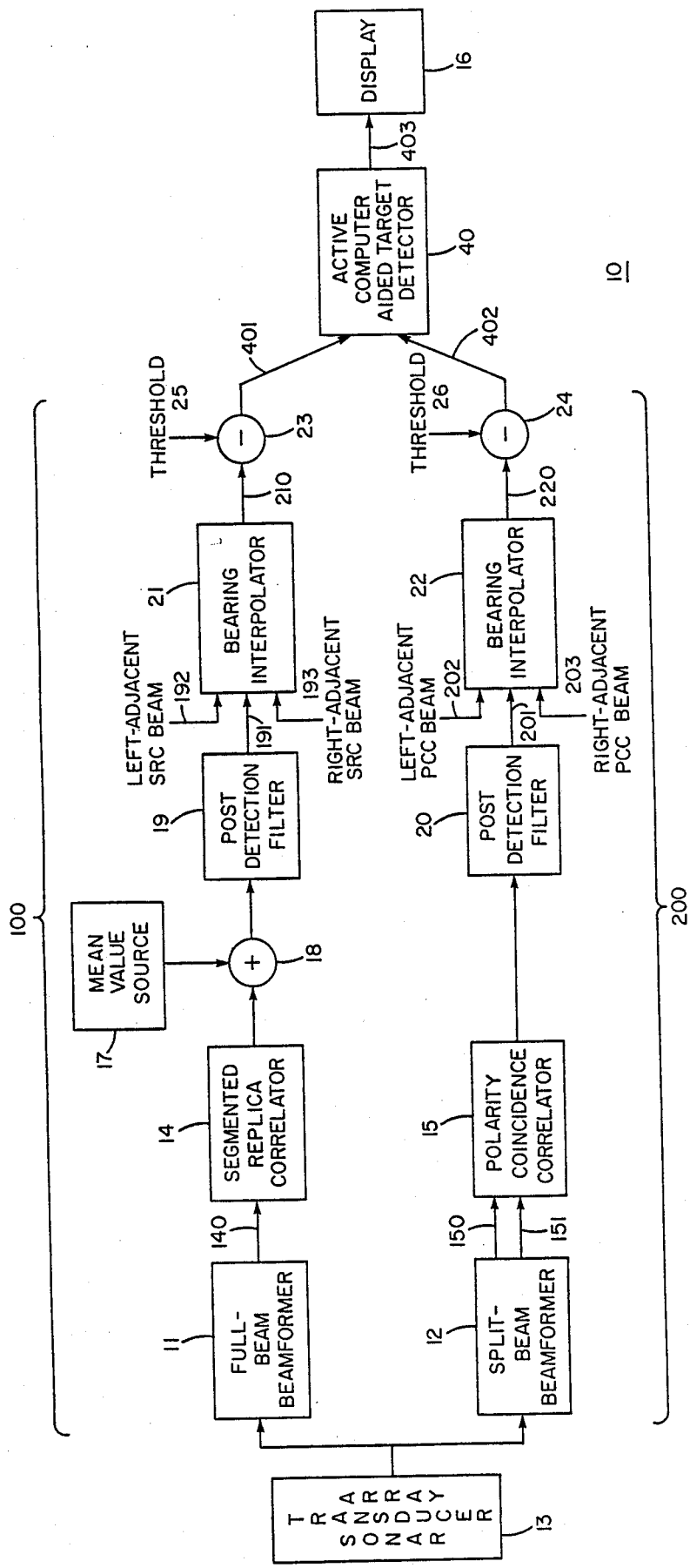
FIG. 1 is a block diagram of the simultaneous coherent and incoherent sonar signal processor of this invention.

The system 10 of this invention which employs simultaneous coherent and incoherent processor channels 100, 200, respectively, of sonar signals is shown in FIG. 1. The active receiver comprises two fundamentally different detection processes operating simultaneously upon sonar signals provided by beamformers 11, 12 connected to a transducer array 13. One detection processor is a segmented replica correlator (SRC) 14 and the other detection processor is a polarity coincidence correlator (PCC) 15. The SRC is essentially a replica correlator, discussed more fully subsequently, operating on a full sum beam output provided by beamformer 11. Hard limiting on the input line 140 of SRC 14 is used for precise amplitude normalization. The SRC 14 is a temporal correlator with pulse compression and provides its best performance when acoustic conditions are good in the ocean environment. By good conditions are meant low multipath and target distortions and low spreading by the ocean medium of the transmitted and received signal in both time and frequency.

The polarity coincidence correlator (PCC) 15 is a split beam cross-correlator which also uses hard limiting for precise amplitude normalization at its inputs 150, 151 provided by the left- and right-half outputs of the split beam beamformer 12. Under good acoustic conditions as described above, its performance is inferior to the SRC; however, under poor conditions, it will outperform the SRC because it is insensitive to distortions of the transmitted signal by the acoustic conditions. The PCC 15 is simply a plane wave sensitive energy detector and does not pulse compress.

The SRC 14 and the CCC 15 receivers have complementary characteristics that are utilized in this embodiment of the invention to improve the detection performance of the system/operator. The receiver system 10 capitalizes on these complementary characteristics in the following way: when acoustic conditions are good, the superior performance of the SRC is provided as an output to the display 16. When acoustic conditions are poor, the best performance allowed by the conditions is provided by the PCC 15 to the display 16. Another characteristic which is employed in this system is that studies of sea data show that these two fundamentally different receivers 14, 15 rarely produce a false alarm (i.e. an apparent signal with no signal present) at the same range and bearing. Hence, if both receivers produce a threshold excess (a perceived signal) at the same time when the threshold is set at a low false alarm probability, such as $P_{FA} = 10 \exp(-4)$, then it is most likely that an echo (defined as a received signal produced by the reflection of the transmitted signal from a stationary or moving target) has produced the event.

The SRC 14 performs poorly against extended targets such as ridges. It tends to produce outputs only on prominent features of the extended target. The PCC 15, on the other hand, performs well against the same extended targets and will provide threshold excess at all ranges and bearings spanned by the target. Hence, the two receivers 14, 15 can be used to sort out extended, non-moving targets from moving targets by utilizing their complementary detection capabilities on these two types of targets.

The segmented replica correlator 14 has its output provided to a mean value source 17 whose value is provided with the appropriate polarity to a summer 18 for removal of the mean value of the SRC 14 output before being provided to a post detection filter 19. The mean output of the SRC 14 is substantially constant under most conditions and therefore the mean output of SRC 14 may be removed by a fixed value from source 17. There may exist some small perturbations on the SRC 14 mean output, and a simple high-pass filter for post detection filter 19 is adequate to remove these perturbations. The output of PCC 15 is provided to post detection filter 20. Post detection filter 20 is discussed subsequently, but its primary purpose is also the removal of the mean value of the signals provided by the correlator 15. The bearing interpolators 21, 22 operating on the output signals provided by post detection filters 19, 20 have as their purpose the decrease in the bearing quantization resulting from each beam of beamformers 11, 12 of the detected signals shown on the display 16.

Each bearing interpolator 19, 20 has three signals on lines 191, 192, 193 and lines 201, 202, 203, respectively, upon which it operates. Interpolators 19, 20 provide an output signal on lines 210, 220, respectively, which has a bearing quantized by a smaller amount than that provided by only the signal on lines 191, 201 which is the result of one beam formed by beamformers 11, 12, respectively. The signals on lines 192, 193 are provided by the SRC's to the immediate left and right of the SCR 191 using the beam formed by beam-former 11. Similarly, the signals on lines 202, 203 are formed by the PCC's adjacent to the PCC 201 using the left- and right-half beams formed by beamformer 12. The design of the post detection filters 19, 20 and the bearing interpolators 21, 22 is also well known to those skilled in the art. The outputs of interpolators 21, 22 are applied to threshold circuits 23, 24, respectively, which are individually thresholded by threshold levels 25, 26 to provide from each threshold circuit 23, 24 a $P_{FA} \cong 10 \exp(-4)$. The $P_{FA}$ is set to this low value so that on a given range sweep, only a few non-acoustic events (false alarms) will be produced by each detection processor 14, 15. This low value of $P_{FA}$ can only be guaranteed by the use of hard limiting at the input for precise amplitude normalization and the use of wide band FM transmitter signal for precise normalization of the input bandwidth for both reverberation and noise limited backgrounds. Each detection processor 14, 15 ultimately provides on lines 401, 402 respectively, to a computer 40 utilizing a computer-aided detection algorithm (ACAD) a list of ranges and bearings of a relatively small number of events. The computer 40 further reduces the number of events on its output line 403 to the display 16.

It should be understood that the circuitry of FIG. 1 shows only one SRC channel 100 and one PCC channel 200 for only one receiving beam. In the actual receiver system 10, the number of SCR 100 and PCC 200 channels would be that number required to cover the desired bearing sector, and these channels would be provided by time-multiplexing of the circuit elements of FIG. 1 in the manner known to those skilled in the art.

Figure 2:
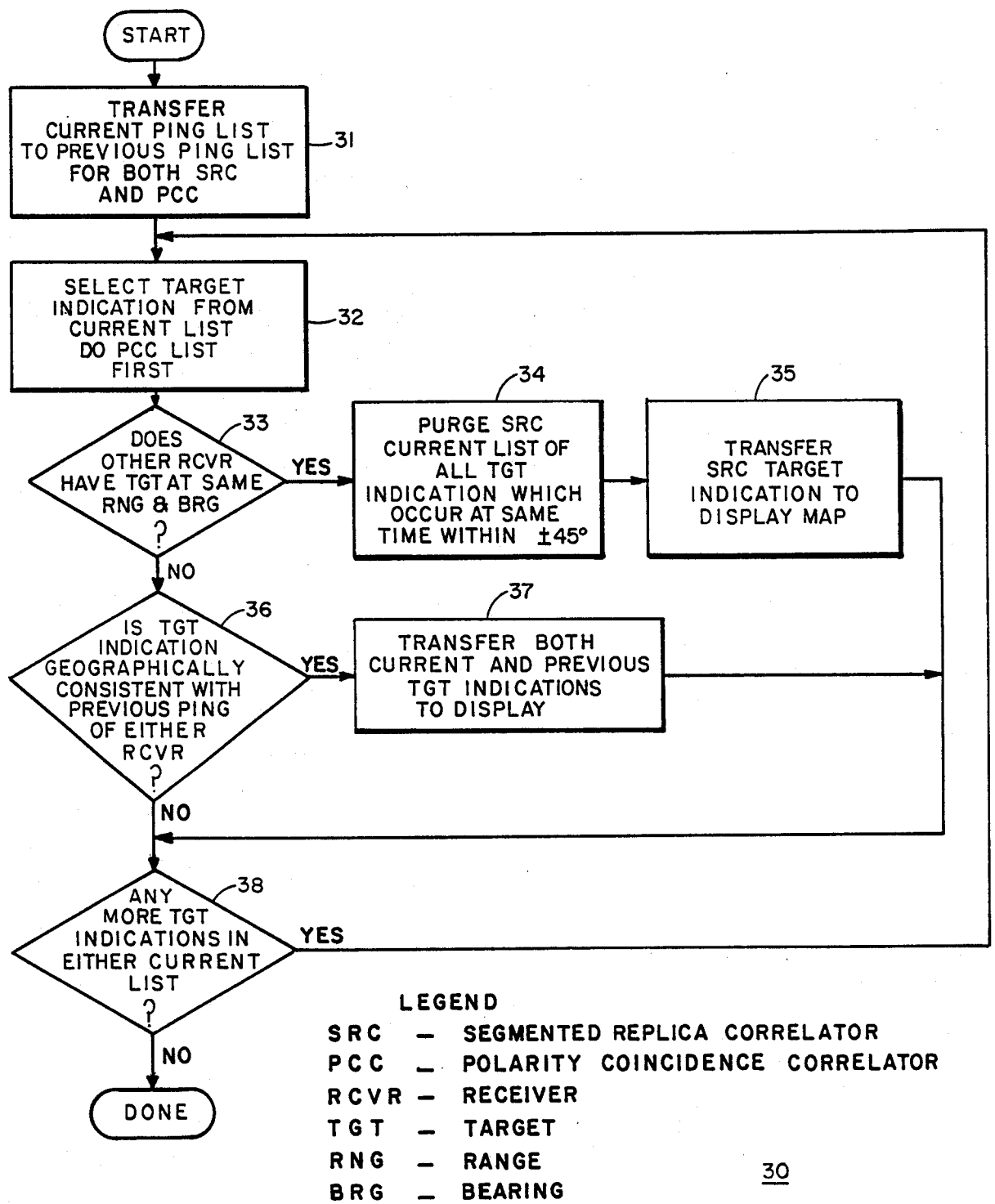
FIG. 2 is a flow diagram for the computer-aided detection algorithm which is implemented by the computer program.

The active computer-aided detection (ACAD) algorithm employed in this invention is a consolidation and automation of detection decision rules which work to provide on the display signals which correspond to reflecting objects while at the same time presenting only a few false targets. FIG. 2 is a flow diagram of the ACAD algorithm. The algorithm is explained as follows:

The inputs to the algorithm are four lists of events. Two of the lists represent the events for the current transmission and reception (a ping) and the previous ping for one of the processors 14, 15. The other two lists are the events for the current and previous pings of the other processor. This process is shown as the contents of rectangle 31 wherein the step of transferring the current ping list to the previous ping list for both the SRC and PCC receivers is indicated when it is time to generate a new "current" list.

The first step is to determine if the current ping lists for the SRC and PCC processors indicate the occurrence of events at the same range intervals. Rectangle 32 shows the step of selecting targets from the information provided in the current list with the PCC list being scanned first and the SCR list secondly. Both lists could be scanned simultaneously as an alternate mode of operation. The decision block 33 performs the comparison of the current ping lists of the PCC and SRC receivers to provide an output on line 330 if there is concurrence. Block 34 indicates that the current list of the SCR is purged of all target indications which occur at the same range interval within plus or minus 45°. Block 34 eliminates the phenomenon called "bearing spreading". The SRC processor, being a sum beam processor, will tend to produce target events on beams whose sidelobes are in the direction of the target at extremely high signal-to-noise ratios. The PCC receiver, however, with proper beam shading, never produces bearing spreading. If the SNR is high enough to produce bearing spreading on the SCR, then it is highly likely that the PCC will also detect a target. Hence, the PCC output can be used to purge the SRC output of spurious events. The output of the purged SRC current list is provided to block 34 which indicates the transfer of the SRC target indications to the display device 16 of FIG. 1.

In order that no event be penalized for lack of concurrency between the SRC and PCC receivers, the next step in the detection process is to compare each event in the current ping list to the events of the previous ping list for each of the receivers. This decision processing is indicated by the decision block 36 in which it is determined whether the target indication is geographically consistent with the previous ping of either receiver. If the answer is yes, then block 37 causes the transfer of both the current and previous target indications to the display 16. Thus, an event is displayed if there is "geographical consistency"; that is, events in the previous and current ping lists that are very close in range and bearing and likely to come from a target constrained in relative speed. This detection decision rule has been proven quite successful in target presentations using actual target data. The decision rule does, however, require a low and controlled $P_{FA}$ to work successfully, which is the motivation for providing both input amplitude and bandwidth normalization in the system of this invention.

The decision block 37 indicates the next step in the process wherein in the absence of geographically consistent targets on the successive pings causes the algorithm to have a decision as to whether there exists any more target indications in either of the current lists. If the answer is that there are more target indications, the flow diagram indicates that the process begins again in the selection block 32 to select the next target indication from the current list of either of the receivers.

The preceding algorithm is implemented by a program which controls a general purpose computer. Such a program may be written by a programmer having ordinary skill in the art of programming.

This preceding algorithm results in a "target only" display which frees the operator observing the display from the detection task and allows him to concentrate his attention as an evaluator in the classification process in evaluating the displayed targets.

Figure 3:
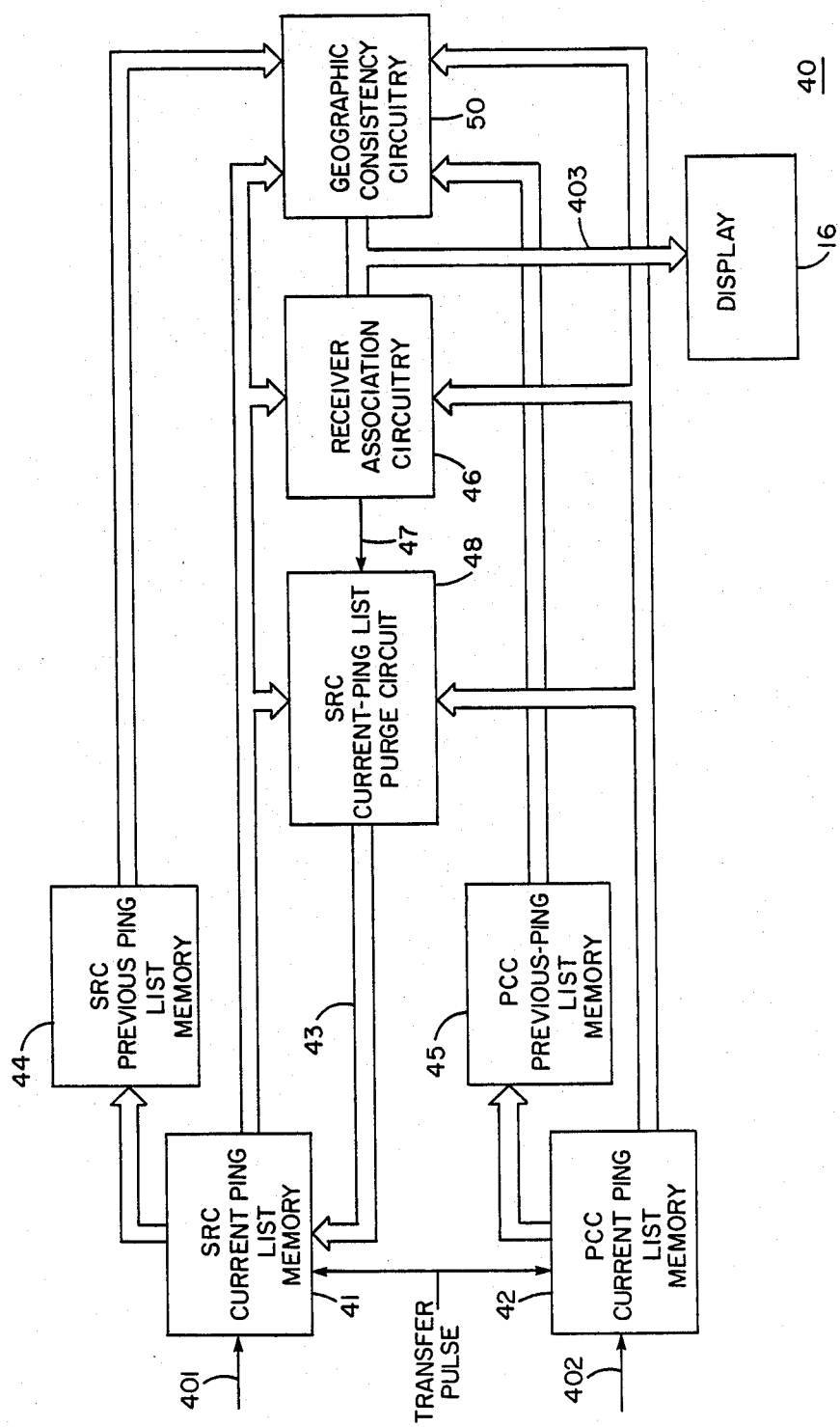
FIG. 3 is a hardware implementation of circuitry which operates in accordance with the algorithm of FIG. 2.

FIG. 3 is a block diagram hardware representation of the active computer-aided target detector 40 which operates to implement the flow diagram illustrated in FIG. 2. SRC channels 100 and PCC channels 200 for each beam are time multiplexed and their range and bearing event outputs presented on lines 401, 402, respectively, to an SRC current ping list memory 41 and a PCC current ping list memory 42, respectively. These memories store the range and bearing of each detected signal (an event) provided by the segmented replica correlator 14 and the polarity coincidence correlator 15, respectively. In response to each transfer pulse corresponding to each transmitted pulse, the contents of memories 41, 42 are transferred to memories 44, 45 to store the SRC previous ping list and the PCC previous ping list, respectively, in the memories 44, 45 prior to new target information being read into the current ping memories 41, 42. After all the received events appearing on lines 401, 402 during a range sweep (a ping list) have been recorded in their respective memories 41, 42, memory 4 is sequentially addressed and the range and bearing at each address is compared with the range and bearing at all the addresses of memory 41 to determine a coincidence in range and bearing of a stored event in both memories 41, 42. The receiver association circuit 46 makes the comparison, and for any coincidence in range and bearing of the contents of memories 41 and 42, circuit 46 provides a signal on line 47 to actuate purge circuit 48. Purge circuit 48 responds by reading out the stored events from all addresses of CCR current list memory 41 and blocking the rewriting in of those events contained in memory 41 over a predetermined bearing spread and at the same range at which coincidence was detected. This operation purges SRC memory 41 of events within a bearing sector on either side of the bearing at which coincidence in bearing and range in both the SRC and PCC memories 41, 42 was obtained.

The receiver association circuitry 46 provides an output reading of range and bearing at which the SRC memory 41 and PCC memory 42 both indicate the presence of an event or target. The range and bearing in digital form are provided by the receiver association circuitry 46 to the display 16 which presents this data as an illuminated spot at the proper range and bearing of display 16.

After the detection of a coincidence in range and bearing of SRC and PCC memories 41, 42, the subsequent purging of SRC memory 41, and the transmission of the range and bearing to the display 16, the next sequential address of PCC memory 42 is read out and the above-described process of scanning the addresses of the SRC memory to determine whether a coincidence in range and bearing in memories 41, 42 exists continues until all memory locations in the PCC memory have been examined. The operation of the circuit of FIG. 3 thus far has executed the steps 31-35 of the flow chart of FIG. 2.

In the implementation of block 36 of FIG. 2 which follows the preceding operations of the circuits of FIG. 3, the purged SRC current ping list memory 41 and the PCC current ping list memory 42 are sequentially addressed and for each address of both memories 41, 42, all the addresses of SRC previous ping list memory 44 and PCC previous ping list memory 45 are read out and compared in geographic consistency circuitry 50. Geographic consistency circuitry 50 provides at its output 403 to display 16 the range and bearing of all events provided by either memory 41 or 42 and the range and bearing of all events provided by either memory 44 or 45 when the ranges and bearings of both are within a predetermined difference value. This operation can be accomplished by circuitry 50 taking the difference in the ranges and the difference in the bearings and comparing these differences with predetermined values in a comparison circuit.

If a previous event is determined to have occurred within a predetermined region of range and bearing with respect to a current event, the geographic consistency circuitry 50 provides both events to the display 16 thereby indicating the current and previous locations of a target or event. The functions provided by the geographic consistency circuitry 50 and the memories 41, 42, 44, 45 are those shown in the blocks 36 and 37 of FIG. 2. Read out of the successive location of memories 41 and 42 by incrementing an address generator (not shown) for both memories 41 42 carries out the function of decision block 37 of FIG. 2.

In summary, in this invention, the segmented replica correlator 14 with hyperbolic waveform is coupled with the PCC 15 which is a totally different kind of correlator, a plane wave correlator rather than a time correlator. Under conditions where the transmission medium badly distorts the received waveform, the PCC continues to function whereas the SRC performance degrades. Under good conditions where the medium does not distort, the PCC does not work as well as the SRC. In the PCC, which is a plane wave correlator, there is in the water medium what amounts to two sensors, i.e. two half beams. Anything coming in on these two sensors is cross-correlated to determine if they are the same signal. What the two sensors are doing is comparing waveforms. But, in terms of time, it is an incoherent processing. The PCC correlator doesn't care how badly distorted the waveform is, it merely cares that there is the same signal on both channels. Therefore, under bad distortion conditions, the PCC will perform very well. Where there is little distortion, the PCC will still perform but not perform as well as the segmented replica correlator.

In the prior art, implementation of the PCC has been in the analog domain which is a technique well known to those skilled in the art. In this invention, the SRC and PCC are obtained at base band by quadrature demodulation of the bandpassed signal having a center frequency $f_o$. Sampling of this signal at a sampling frequency at least four times that of the center frequency at base band results in substantially the same loss in signal-to-noise ratio as is obtained when using analog correlation. Sampling of the base band signal allows a reduction in sample rate thereby allowing the received signals of many beams to be processed independently of one another by the same correlator by time multiplexing. Historically, the PCC has not been implemented at base band, but rather at $f_o$ (the center frequency of the modulated transmitted signal).

The receiver system 10 of this invention utilize a wideband FM received signal produced by a transmitter (not shown) because only wideband FM can provide simultaneous reverberation limited and noise limited performance for all dopplers. The most popular FM waveform currently in use in the prior art is linear FM (LFM). However, as wider bandwidths are employed, e.g., 2,000 Hz, the doppler sensitivity of LFM becomes large. The 3 db doppler sensitivity of a 240 millisecond pulse length, 1,000 Hz waveform, is calculated as 10.8 knots. Hence, if LFM is used, and if it is desired to cover a range of plus or minus 40 knots, then nine parallel receiver structures are required just to cover the target doppler.

To overcome the need for multiple parallel receiver structures, prior art hyperbolic FM (HFM), sometimes called "linear period modulation" (LPM) was chosen for use in this invention because it is substantially "doppler invariant". With any wideband waveform there are two sources of doppler loss, (1) overlap loss, and (2) slope mismatch. Overlap loss occurs because the peak of the correlation function formed by correlating the zero doppler replica and the doppler shifted waveform occurs when the envelopes of the signal and the replica are not coincident (i.e. doppler induced range error). This loss exists for both LFM and HFM but is small for large bandwidth-time products. Slope mismatch occurs with LFM because doppler changes the frequency versus time slope of the waveform and is a major source of loss with wideband LFM. However, with HFM, it is always possible to match the slope by proper selection of time delay; hence, there is no slope mismatch loss. The major ramification of the selection of HFM is that only a single receiver is needed to cover all dopplers. In summary, HFM is chose for the following reasons: HFM provides equal noise and reverberation limited operation for all target dopplers; HFM doppler sensitivity is so low that multiple doppler bank receivers are not required; and HFM can be used for both detection and classification. The segmented replica correlator (SRC)14 of FIG. 1 will work for any arbitrary waveform including HFM.

Figure 4:
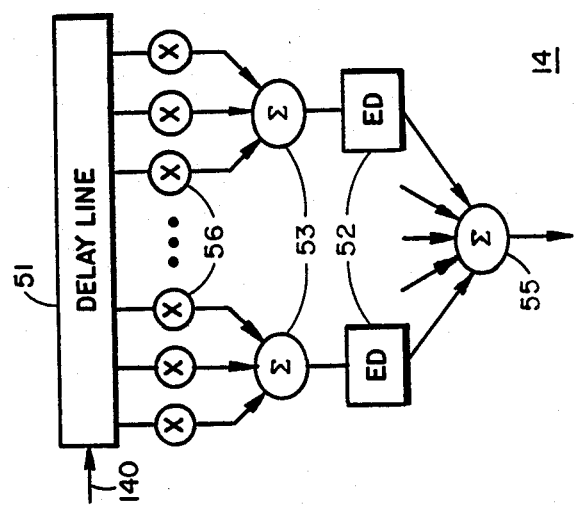
FIG. 4 is a functional diagram of the segmented replica correlator implemented as a matched finite impulse response filter
Figure 5:
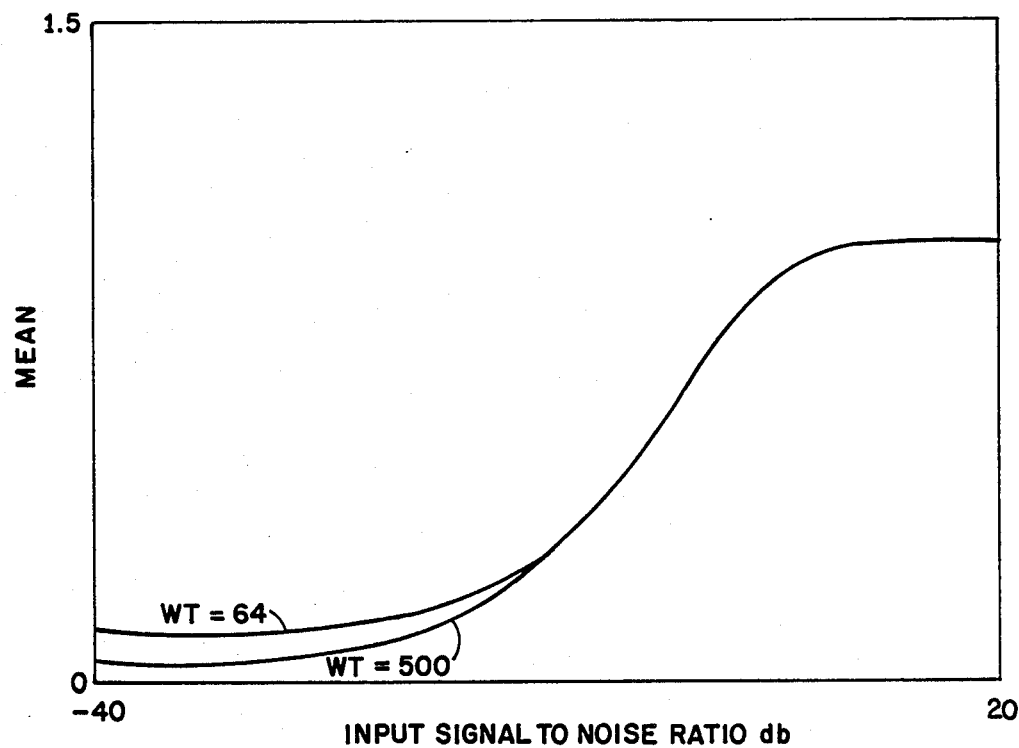
FIG. 5 is a plot of the mean output of the segmented replica correlator for different time-bandwidth products at different input signal-to-noise ratios.
Figure 6:
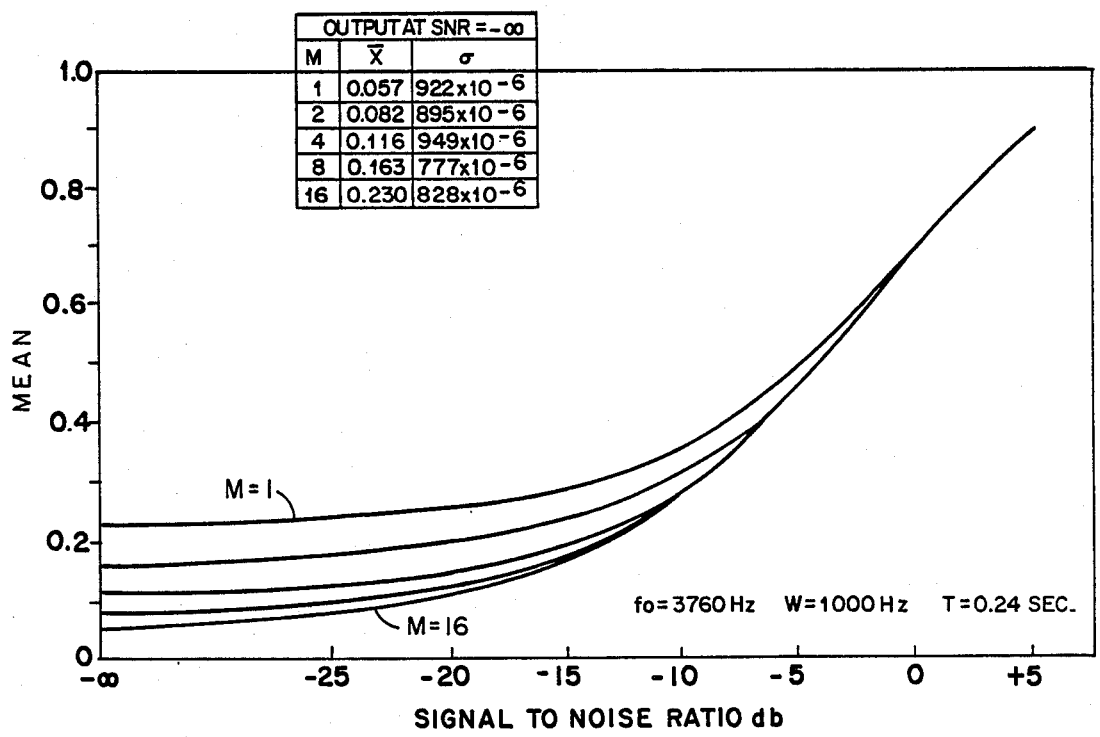
FIG. 6 is a plot of the mean output versus signal-to-noise ratio for different degrees of segmentation of the segmented replica correlator.
Figure 7:
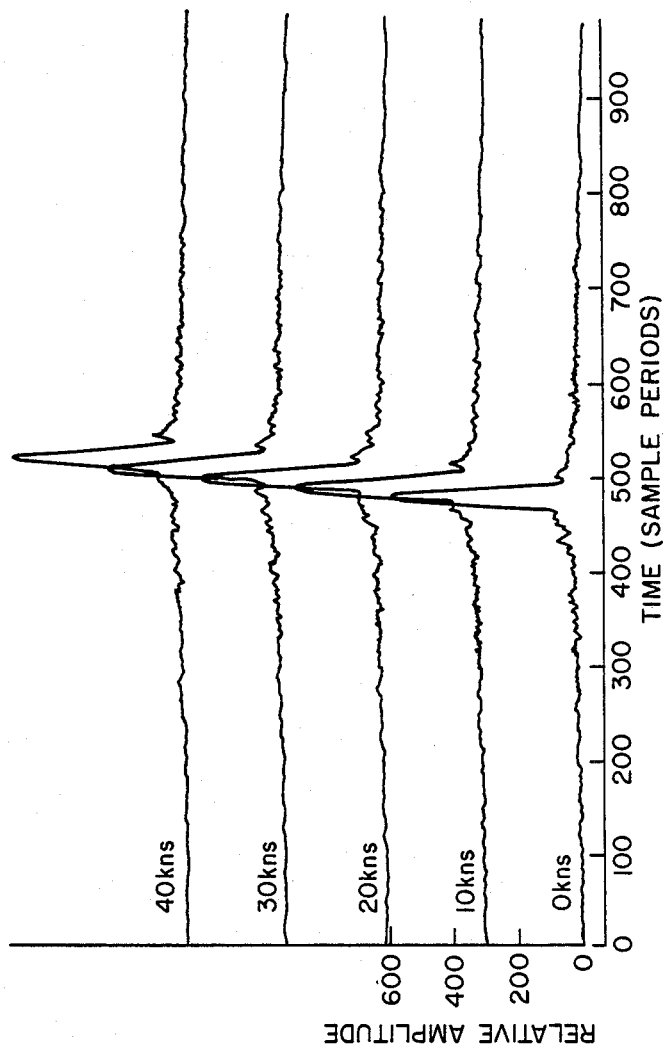
FIG. 7 is a plot of the output of the segmented replica correlator as a function of doppler frequency.

FIG. 4 shows a functional diagram of the SRC when it is implemented as a matched finite impulse response (FIR) filter operation. The FIR filter coefficients of the multipliers 56 connected to taps on the delay line 51 are the signal replica. A difference between the SRC and a matched filter is the insertion of the envelope detectors 52 at the output of the summing circuits 53 to which a small group of the multipliers provide inputs. The SRC 14 divides the input waveform on its input line 140 into M segments and replica correlates each segment individually; the individual correlations provided at the outputs of the summing circuits 53 are then combined in summing circuit 55 after envelope detection in detectors 52. The SRC provides the gain of a matched filter, i.e. 2WT, yet it is not as sensitive to medium spreading effects. The reduced sensitivity comes at the expense of range resolution which is not of concern in the detection problem. A computer-based mathematical model of the SRC preceded by clipping was developed in which the input signal was a hyperbolic FM signal. Computer generated signal plus noise was passed through the SRC of FIG. 4, and the mean output was computed. FIG. 5 represents the normalized output mean as a function of input SNR for time-bandwidth products of 64 and 500. FIG. 6 is a typical plot of the mean output versus SNR for various levels of segmentation M from the simulation where the frequency was 3,760 Hz, bandwidth was 1,000 Hz, and the duration of the receive signal is 0.24 seconds. FIG. 7 is a plot of the SRC 14 output as a function of doppler over the range of 0 to 40 knots.

When the SRC operates with linear FM, the waveform is divided into M segments, each of which span identical time and frequency intervals. However, with HFM as in this invention, one can choose to make the segments span equal time or frequency intervals, but not both simultaneously. Analysis has shown, however, that there is only an imperceptible difference whether equal time or frequency intervals are chosen for the HFM signal.

The SCR 14 using a hyperbolic frequency segmented waveform for detection is an improvement over the segmented replica correlator using a stepped frequency waveform, the frequency being constant during each step. Theoretically, the full replica correlator will provide the best signal detection. But, it has long been known by those skilled in the art that the full replica correlator has seldom lived up to a performance potential because the medium and the target distorted the echo. What is desired is a receiver which has the full benefits of the full replica correlator, the benefits of the prior art PDPC receiver and the benefits of the PCC receiver, and the invention as originally conceived had these three receivers in parallel. The PDPC receiver is a post-detection pulse compression type processor. The SRC has the properties of both the full replica correlator and the PDPC processor. In the SRC, the waveform, which in the preferred embodiment is hyperbolic, is broken into segments, and the correlation occurs only over those segments, and then the correlation outputs are combined.

In the PDPC what is transmitted is a stepped FM waveform which is a succession of short C pulses $f_1$, $f_2$, ... $f_M$ succeeding one another in time. A bank of bandpass filters with center frequencies corresponding to the transmitted frequencies $f_1$, $f_2$, ... $f_M$ filter out each of the pulses $f_1$, $f_2$, ... $f_M$. The output of the filters of the filter bank are detected by detectors, each of whose outputs are appropriately delayed to be in time coincidence and then summed to provide the output signal of the PDPC. Thus, the PDPC is a segmented correlator where each segment is a CW pulse of frequency $f_1, f_2, \ldots f_M$.

The segmented replica correlator using the hyperbolic waveform removes the requirement that each segment must be a constant frequency pulse. The modified segmented replica correlator using the hyperbolic waveform gives all the advantages of the PDPC and also gives all the advantages of the full replica correlator. Other continuous waveforms such as a linear frequency variation over the length of the pulse would also function instead of the hyperbolic waveform but in a less optimum manner. In the undistorted medium, the segmented replica correlator with aq hyperbolic waveform has as much processing gain as the full replica correlator. However, when the medium is producing waveform distortion of received signal, the segmented replica correlator with a hyperbolic waveform will function more like the PDPC processor.

Figure 8:
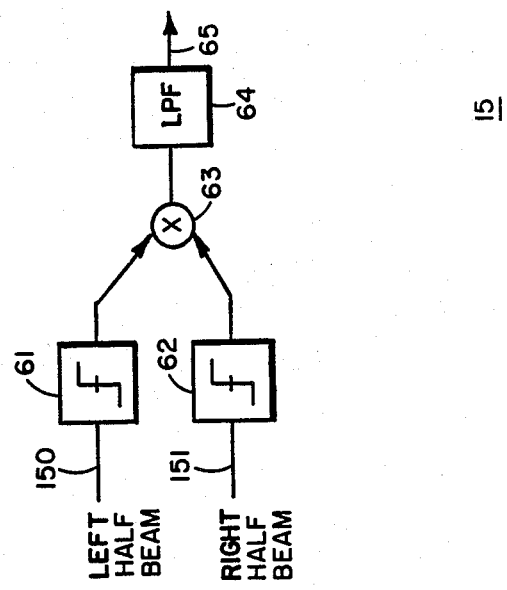
FIG. 8 is a block diagram of the polarity coincidence correlator.
Figure 9:
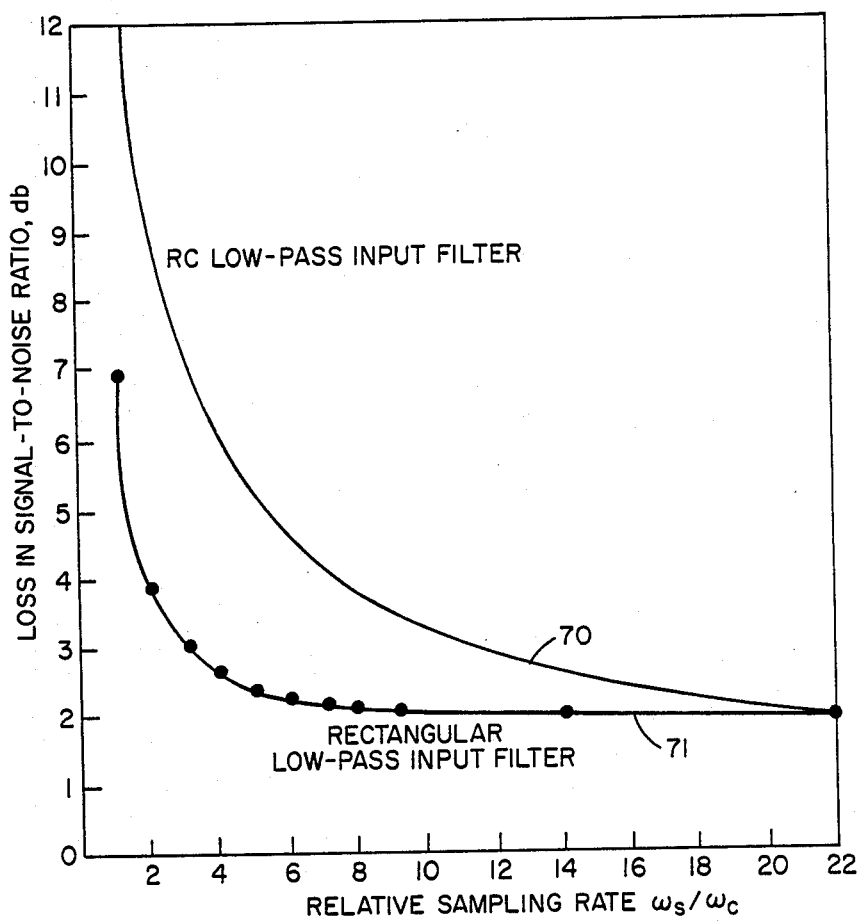
FIG. 9 shows the loss in signal-to-noise ratio as a function of relative sampling rate of the polarity coincidence correlator with different input filters.

The polarity coincidence correlator (PCC) 15 is shown in FIG. 8. Hard limiters 61, 62 are connected to left- and right-half beam signals on lines 150, 151 from the corresponding beam outputs of the split beam beamformer 12. The left- and right-half beam signals, after being limited, are multiplied in multiplier 63 before being applied to the low-pass filter 64 to provide the output correlated signal on line 65. The PCC is implemented at base band frequencies by sampling the signals in each of the right- and left-half channels 150, 151 after limiting in limiters 61, 62 at a sampling frequency $\omega_s$. Substantial decrease in loss of signal-to-noise ratio is obtained when the input filters are rectangular low-pass filters in contrast with a simple one-pole recursive RC filter. FIG. 9 shows the loss in signal-to-noise ratio as a function of relative sampling rate $\omega_s/\omega_c$ ($\omega_c$ is the cut-off frequency of the filter) for the case of the RC low-pass input filter, curve 70 (from IEEE Transactions on Information Theory, January 1963, H. Ekre); and the rectangular low-pass input filters, curve 71.

Figure 10:
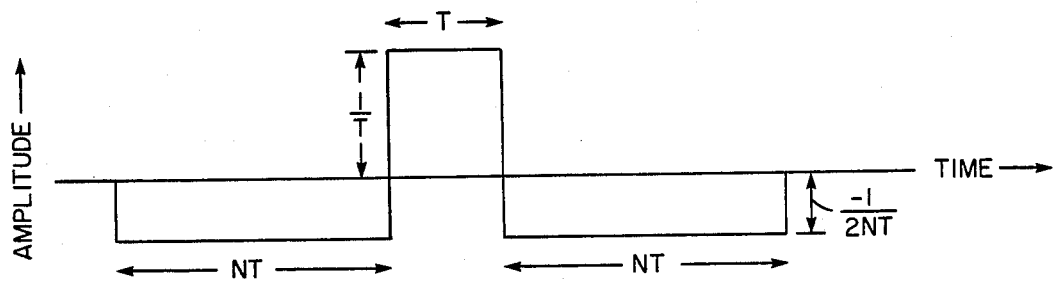
FIG. 10 is an amplitude-time diagram for a finite impulse response filter.

The mean value of the signal produced by the polarity coincidence correlator 15 is not deterministic. The mean value is a function of what is happening in the water environment so that the post-detection filter 20 is desired to be a tracking type filter. It is not possible to remove the mean of PCC 15 as at the output of the SCR 14 by the use of a constant subtracted from the output of the correlator 14. In essence, the post-detection filter 20 is a high pass filter. In the PCC 15 output, there is correlated interference signal produced by the ocean and the noise of the ship carrying the sonar system which provides a variety of "steady-state" correlated interference signals with varying correlation levels. These correlated interferences are dynamically but slowly changing. The post-detection filter 20 must track these variations without significantly changing the established PFA. The filter must also have a low probability of causing spurious target indications from high SNR targets which are off-axis. The filter 64 also should not significantly degrade the output SNR from the detection processor 15. The output mean which is a function of range (i.e. a function of ownship noise correlation and reverberation) was used to evaluate the dynamic response of the post-detection filter 20. Another criteria for the design of the filter 20 is that for a high SNR target, beams adjacent to the beam which is directed on the target produce a large negative output which when combined with the impulse response of the filter can cause threshold excesses to the left or right of the real target and also before and after in range. The best overall performance was obtained by an FIR filter of the form shown in FIG. 10 where T is the transmitted pulse length and N is a constant. A value of N=6 is about the minimum value that proved satisfactory, resulting in a filter that is 14 pulse lengths long.

Having described a preferred embodiment of the invention, it will be apparent to one of skill in the art that other embodiments incorporating its concept may be used. It is believed, therefore, that this invention should not be restricted to the disclosed embodiment but rather should be limited only by the spirit and scope of the appended claims.

What is claimed is:

1. A sonar system for detecting signals reflected from objects which are insonfied by a transmitted sonar pulse comprising:
   a first and second sonar receiver for simultaneously processing said reflected signals;
   said first receive being a segmented replica correlator type of receiver;
   said second receiver being a polarity coincidence correlator type of receiver;
   said first and second receivers providing output signals corresponding to said objects at first and second false alarm rates at their respective outputs;
   means selecting one output of the outputs of said first and second receivers to provide an output signal having a lower false alarm rate than that provided by said first an second receivers individually.

2. The system of claim 1 wherein:
   said replica correlator is a segmented replica correlator;
   a transducer array;
   first beam-forming means providing a full-beam signal connected between said transducer array and said segmented replica correlator receiver; and
   second beam-forming means providing split beam signals connected between said transducer array and said polarity coincidence correlator.

3. A sonar receiving system for providing the range and bearing of an object form a sequence of first and second signal returns reflected from the object which is insonfied by a corresponding sequence of first and second transmitted sonar signals comprising:
   a segmented replica first correlator;
   a polarity coincidence second correlator;
   said sequence of signal returns being connected to an input of said segmented replica first correlator and of said polarity coincidence second correlator;
   a detector whose input is connected to an output of each of said first and second correlators;
   said detector providing a range and bearing output signal and being responsive to the range and bearing signal of each of said first and second correlator outputs to provide a corresponding detector output signal when the range and bearing of said first signal return from said first and second correlator outputs coincide;
   said detector comprising means to determine the difference in range and bearing of said first and second signals; and
   said detector providing said first signal range and bearing output signal in response to said difference determining means when the range and bearing of either correlator output of the first signal return is within a prescribed difference from the range and bearing of either correlator output of the second signal return.

4. The sonar receiving system of claim 3 wherein said acoustic source comprises:
   a transducer array;
   a full-beam beamformer having its output connected to the input of said segmented replica correlator and an input of said full-beam beamformer connected to the transducers of said array;
   a split-beam beamformer having two outputs, each output connected to a separate input of said polarity coincidence correlator, and its inputs of said split-beam beamformer connected to the transducers of said array.

5. The sonar receiving system of claim 3 wherein said segmented replica correlator and said polarity coincidence correlator each have hard limiting and bandwidth limiting of the signal at their inputs.

6. The sonar receiving system of claim 5 comprising in addition:
   a mean value removal circuit connected to the output of said segmented replica correlator;
   a first post-detection filter connected to the output of said mean value removal circuit;
   a bearing interpolator connected to the output of said first post-detection circuit;
   a first threshold circuit connected to the output of said first bearing interpolator;
   the output of said first threshold circuit being connected to a first input of said computer-aided target detector; and
   a display connected to the output of said target detector.

7. A sonar receiving system comprising:
   a source of successive ping acoustic return signals;
   a segmented replica correlator means connected to said source;
   a polarity coincidence correlator means connected to said source;
   a computer-aided target detector whose inputs are connected to output signals of said correlators;
   said detector providing a range and bearing output signal and being responsive to the range and bearing of output signals of each of said outputs to provide a corresponding detector output signal when the range and bearing of said correlators, output signals coincide;
   said detector comprising means to determine the difference in range and bearing of said first and second signals; and
   said detector providing said first signal range and bearing output in response to said difference determining means when the range and bearing of either correlator output on a previous ping return signal is within a prescribed difference from the range and bearing of either correlator output on a current ping return signal.

8. The sonar receiving system of claim 7 wherein said acoustic source comprises:
   a transducer array;
   a full-beam beamformer having its output connected to the input of said segmented replica correlator and an input of said full-beam beamformer connected to the transducers of said array;
   a split-beam beamformer having two outputs, each output connected to a separate input of said polarity coincidence correlator, and its inputs of said splitbeam beamformer connected to the transducers of said array.

9. The sonar receiving system of claim 8 wherein said segmented replica correlator and said polarity coincidence correlator each provide at their respective outputs hard limiting and bandwidth limiting of the signal at their inputs.

10. The sonar receiving system of claim 9 wherein said detector comprises a computer in which the output signals of said segmented replica correlator (SRC) means and said polarity coincidence correlator (PCC) means are processed, said computer comprising:
    means transferring current SRC and PCC correlator signals in a first memory into previous SRC and PCC output signals in a second memory;
    means storing said SRC and PCC correlator output signals in an SRC and PCC current output signals in said first memory;
    means selecting a current PCC output signal from said first memory;
    means comparing the range and bearing of said current PCC output signal from said first memory with the range and bearing of a current SRC output signal from said first memory to determine coincidence;
    means responsive to said coincidence of range and bearing purging said SRC current list of all SRC signals at the same range and for bearings within a predetermined bearing sector in said first memory and providing the range and bearing of the coincidence as an output signal to a display;
    means responsive to said coincidence not occurring to compare the range and bearing of said selected current PCC output signal from said first memory with the range and bearing of output signals of the previous RRC and PCC output signals of said second memory to determine whether said current and previous output signals are within predetermined differences;
    means responsive to said current and previous output signals from said first and second memories, respectively, to display both said current PCC and previous SRC or PCC output signals when said current PCC and previous SRC or PCC output signals are within said predetermined differences; and
    means selecting and providing to said means comparing a different current PCC and a current SRC output signal, both of the same range and bearing, from said first memory when said means responsive to said current PCC and previous SRC or PCC output signals from said first and second memories, respectively, are not within said predetermined differences.

11. The sonar receiving system of claim 9 comprising in addition:
    a mean value removal circuit connected to the output of said segmented replica correlator;
    a first post-detection filter connected to the output of said mean value removal circuit;
    a first threshold circuit connected to the output of said first post-detection filter;
    the output of said first threshold circuit being connected to a first input of said computer-aided target detector;
    a second post-detection filter connected to the output of said second post-detection filter and a second input of said computer-aided target detector; and a display connected to the output of said target detector.

12. The system of claim 11 comprising in addition:
a first and second bearing interpolator connected between the output of said first and second post-detection filters, respectively, and said first and second inputs of said computer-aided target detector.

13. The sonar system of claim 7 wherein said computer-aided target detector comprises:
first means for storing the segmented replica correlator (SRC) means and the polarity coincidence correlator (PCC) means current ping output signals in range and bearing;
second means for storing the SRC means and PCC means previous ping output signals in range and bearing connected to an output of said first storing means;
receiver association circuitry having inputs from said SRC and PCC first storing means to determine correspondence between said SRC and PCC output signals range and bearing;
means responsive to said correspondence connected to said SRC current ping signals stored in said first storing means to purge SRC signals having in a prescribed bearing sector stored in said first storage means having the same range as the SRC and PCC signals having said correspondence;
a display means;
said receiver association circuitry also providing an output signal of a range and bearing to said display means in response to a correspondence between said SRC and PCC output signals range and bearing;
means for comparing the SRC and PCC current ping output signals from said first storing means with the SRC and PCC previous ping output signals from said second storing means to determine correspondence between said compared signals within a predetermined range and bearing increment and to provide said compared signals to said display means when such correspondence exists.

* * * * *